Jan. 8, 1935.  A. B. FULLER  1,987,058
FILTER HOLDER
Filed April 10, 1934
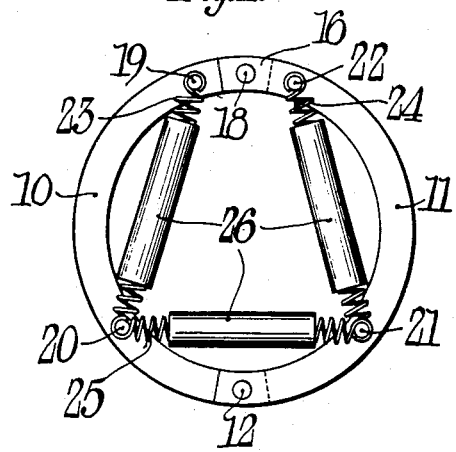
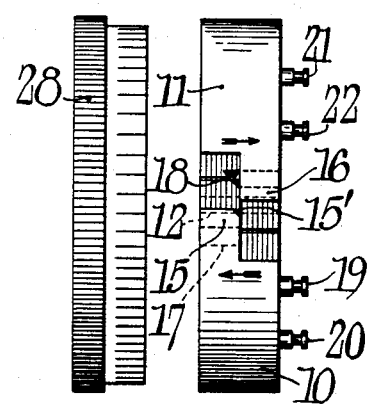
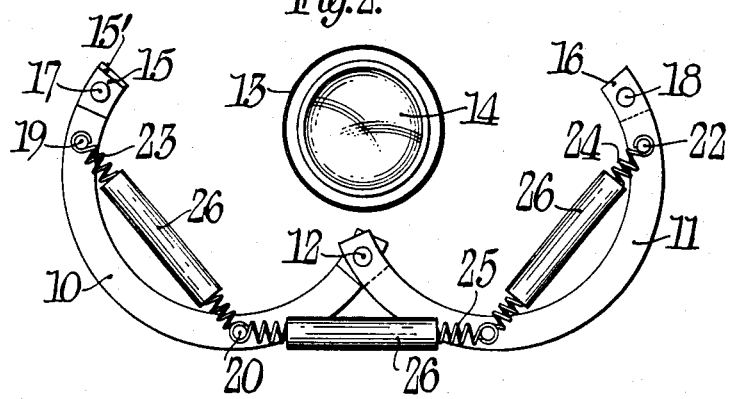
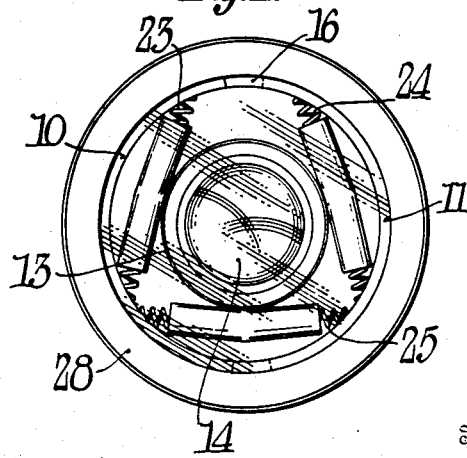
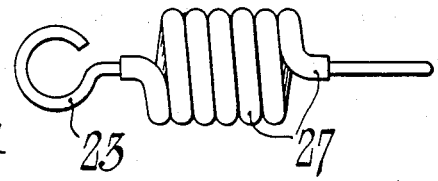
Inventor:
Albert B. Fuller,
By Newton M. Perrin
George A. Gillette, Jr.
Attorneys Patented Jan. 8, 1935

1,987,058

UNITED STATES PATENT OFFICE 1,987,058

FILTER HOLDER

Albert B. Fuller, Rochester, N. Y., assignor to Eastman Kodak Company, Rochester, N. Y., a corporation of New York Application April 10, 1934, Serial No. 719,884

11 Claims. (Cl. 95—81)

The present invention relates to a filter holder and more particularly to a photographic filter holder for attaching a filter to lens barrels of different diameters.

A complete photographic optical outfit includes several filters of different characteristics and several lenses of different sizes and diameters. The variation in the sizes and diameters of the lenses either necessitates a complete set of filters for a lens of each diameter or some form of holder or adapter for attaching each filter of a set to the various diameter lenses. Filter holders embodying this universal feature are known but are quite generally unsatisfactory either because of complication in design or as failing to give satisfactory service.

The primary object of the present invention is the provision of a filter holder which may be readily attached to lens barrels of different diameters and which is of simple but rugged construction.

Another object of the invention is the provision of a filter holder which includes a pair of semi-annular frame members hinged to each other and a plurality of spring members on said frame members and for engaging lens barrels of different diameters.

A further object of the invention is the provision of a filter holder comprising a pair of hinged frame members and an extensible spring member which functions to bias said frame members to closed or open position and to press against the exterior of a lens barrel.

Still another object is the provision of a filter holder consisting of a pair of hinged frame members which carry interengaging parts for latching said frame members in closed position encircling a lens barrel.

Other objects will be obvious to those skilled in the art as the invention is more fully described hereinafter.

Reference is hereby made to the accompanying drawing wherein like reference characters designate similar elements and wherein:

Fig. 1 is a rear view in closed position of the filter holder according to the invention.

Fig. 2 is a rear view of the filter holder in open position.

Fig. 3 is an edge view of the filter holder approaching closed position and of a filter to be mounted on said holder.

Fig. 4 is a front view of the filter holder of the invention attached to a lens barrel and supporting a filter.

Fig. 5 is a detail of a modified form of spring member which has a coating of electro-deposited rubber.

In the illustrated embodiment, the filter holder comprises a pair of frame members 10 and 11 which are of semi-annular formation and which are pivotally connected to each other by a hinge pin 12. Frame members 10 and 11 are movable to an open position, see Fig. 2, and to a closed position, see Fig. 4, in which they are adapted to encircle a lens barrel 13 carrying a lens 14. Inter-engaging portions are provided on the free ends of frame members 10 and 11 and include a tongue 15 on frame member 10 and a tongue 16 on frame member 11. Tongue 15 has a beveled edge 15', see Fig. 3, and is provided with a hole 17. Tongue 16 carries a pin 18 which has a beveled end and which is adapted in closed position of frame members 10 and 11 to engage hole 17 in tongue 15.

A plurality of extensible spring members are mounted upon frame members 10 and 11 by a plurality of supports and are adapted in closed position of said frame members 10 and 11 to press against the lens barrel 13. The aforementioned supports may comprise studs 19, 20, 21 and 22 which are threaded into the frame members 10 and 11 and which are located in pairs upon said frame members, studs 19 and 20 being on frame member 10 and studs 21 and 22 being on frame member 11.

Said extensible spring members are preferably coil springs, one coil spring 23 being mounted between studs 19 and 20 on frame member 10, another coil spring 24 being mounted between studs 21 and 22 on frame member 11, and another coil spring 25 being mounted between stud 20 on frame member 10 and stud 21 on frame member 11. The studs 19, 20, 21 and 22 are so located on frame members 10 and 11 that they form the vertices of a trapezoid and the coil springs 23, 24 and 25 extend along three sides of said trapezoid and also extend along chords of the frame members 10 and 11.

The extensible spring members are each covered with a section of rubber tubing 26 so that the exterior of the lens barrel 13 will not be marred or scratched by the convolutions of springs 23, 24 and 25. Alternatively, the spring members 23, 24 and 25 may be covered with a coating of rubber 27 which has been electro-deposited thereon, see Fig. 5.

When the frame members 10 and 11 are moved to closed position, the extensible spring members press against the exterior of the lens barrel 13 and are flexed an amount corresponding to the diameter of said lens barrel 13, see Fig. 4. In this closed position of the frame members 10 and 11, a filter, which includes a frame 28, may be fitted onto the outer periphery of said frame members.

The filter holder may be designed for attachment to all the lenses of a series or to only certain lenses of a series. For instance, as illustrated, the filter holder is suitable for attachment to all the lenses of a commercial series except the 4.5 inch and 6 inch telephoto lenses, to which the filter frame 28 may be directly attached.

The extensible spring member 25 aside from the function of pressing against lens barrel 13 serves also resiliently to maintain frame members 10 and 11 in open or closed position. The studs 20 and 21 are so located on respective frame members 10 and 11 that the spring member 25 crosses the axis of the hinge pin 12 during movement of the frame members from closed to open position. Therefore spring member 25 acts resiliently to bring the interengaging portions on frame members 10 and 11 into interengagement until said frame members have been opened sufficiently so that the spring 25 is on the other side of the axis through hinge pin 12 when said spring 25 acts to hold frame members 10 and 11 in open position as shown in Fig. 4.

Many modifications of the illustrated filter holder are possible without departing from the scope of the invention, which is defined by the appended claims.

Having now particularly described my invention what I desire to secure by Letters Patent of the United States and what I claim is:—

1. In a filter holder, the combination with a pair of semi-annular frame members which are pivotally connected to each other and which are movable to a closed position and to an open position, of a plurality of extensible spring members, mounted on said frame members to extend along chords thereof and adapted in closed position of said frame members to press against a lens barrel.

2. In a filter holder, the combination with a pair of semi-annular frame members which are pivotally connected to each other and which are movable to a closed position and to an open position, of a plurality of extensible spring members, and a plurality of supports on said frame members for supporting said spring members to extend along chords of said frame members, said spring members being adapted in closed position of said frame members to engage a lens barrel.

3. In a filter holder, the combination with a pair of semi-annular frame members which are pivotally connected to each other and which are movable to a closed position and to an open position, of a plurality of extensible spring members mounted on said frame members to extend along chords thereof and adapted in closed position of said frame members to press against a lens barrel, and a rubber covering on said spring members and for engaging the lens barrel.

4. In a filter holder, the combination with a pair of semi-annular frame members which are pivotally connected to each other and which are movable to a closed position and to an open position, of a plurality of extensible spring members mounted on said frame members to extend along chords thereof and adapted in closed position of said frame members to press against a lens barrel, and a rubber tube over each spring member and for contacting the lens barrel.

5. In a filter holder, the combination with a pair of semi-annular frame members which are pivotally connected to each other and which are movable to a closed position and to an open position, of a plurality of extensible spring members mounted on said frame members to extend along chords thereof, adapted in closed position of said frame members to press against a lens barrel and provided with an electro-deposited rubber coating at least along those portions that contact said lens barrel.

6. In a filter holder, the combination with a pair of semi-annular frame members, and a pivotal connection between said frame members to permit movement thereof to an open position and to a closed position, of a pair of supports on each frame member, an extensible spring member between the support of a pair on each frame member, and another extensible spring member extending between one support on one frame member and one support on the other frame member.

7. In a filter holder, the combination with a pair of semi-annular frame members which are pivoted to each other and which are adapted in a closed position to encircle a lens barrel, of a support on each of said frame members, and an extensible spring member connected between said supports, adapted resiliently to maintain said frame members in closed position and resiliently to press against said lens barrel in said closed position of the frame member.

8. In a filter holder, the combination with a pair of semi-annular frame members which are adapted in a closed position to encircle a lens barrel, and a pivotal connection between said frame members and having an axis about which said frame members may swing to an open position, of a support on each of said frame members, and an extensible spring member connected between said supports, adapted resiliently to maintain said frame members in a closed position, and adapted, upon movement of said frame members to open position, to move across the axis of the pivotal connection and resiliently to hold said frame members in open position.

9. In a filter holder, the combination with a pair of semi-annular frame members which are adapted in a closed position to encircle a lens barrel and to support a filter upon their periphery, and a pivotal connection between said frame members and having an axis about which said frame members may swing to an open position, of a support on each of said frame members, and an extensible spring member connected between said supports, adapted resiliently to maintain said frame members in closed position and adapted upon movement of said frame members to open position to move across the axis of the pivotal connection and resiliently to hold said frame members in open position.

10. In a filter holder, the combination with a pair of semi-annular frame members, and a pivotal connection between the ends of said frame members, of a pair of supports mounted on each frame member and located to form the vertices of a trapezoid, and a plurality of extensible spring members connected between said supports and extending along three sides of said trapezoid.

11. In a filter holder, the combination with a pair of semi-annular frame members which are pivotally connected to each other and which are adapted in closed position to encircle a lens barrel, and inter-engaging portions on the free ends of said frame members and adapted in closed position thereof to lock said ends together, of a support on each of said frame members, and an extensible spring member connected between said supports, adapted resiliently to move said frame members to closed position for inter-engagement of said portions and resiliently to press against the lens barrel in the closed position of said frame members.

ALBERT B. FULLER.